Figure 1:
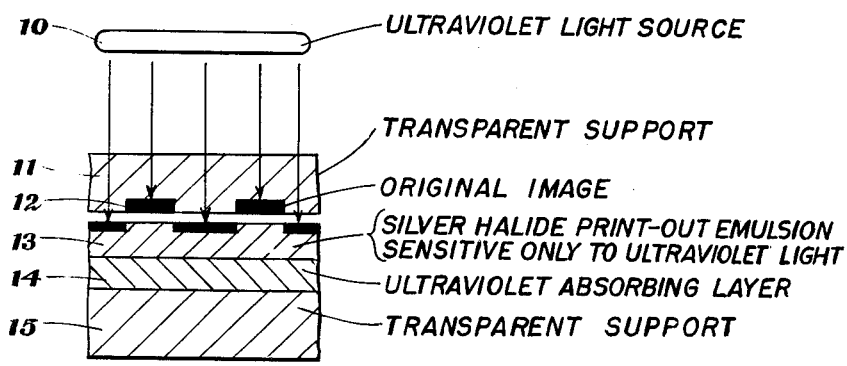

May 31, 1966 — L. M. CONDAX — 3,253,918
PRINT-OUT ELEMENT
Filed June 1, 1962 — 2 Sheets-Sheet 1

Louis M. Condax
INVENTOR.

May 31, 1966  L. M. CONDAX  3,253,918
PRINT-OUT ELEMENT
Filed June 1, 1962  2 Sheets-Sheet 2
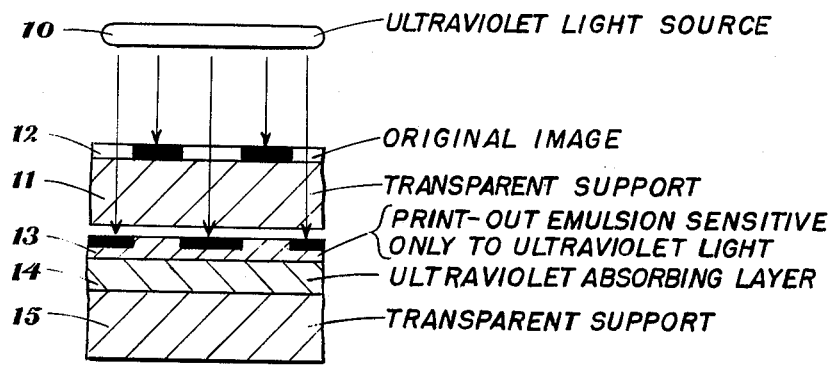
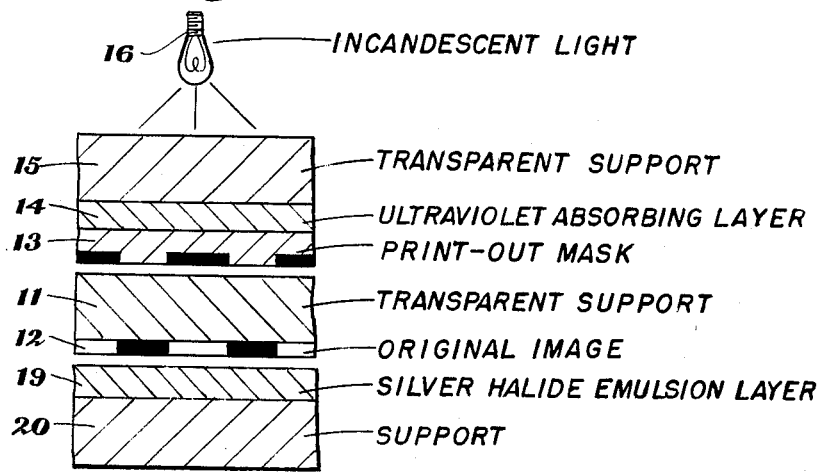
Louis M. Condax
INVENTOR.

3,253,918
PRINT-OUT ELEMENT
Louis M. Condax, Rochester, N.Y., assignor to Eastman Kodak Company, Rochester, N.Y., a corporation of New Jersey
Filed June 1, 1962, Ser. No. 199,460
6 Claims. (Cl. 96—44)

This invention is related to the use of photographic elements in photographic reproduction and more particularly to print-out elements and their use as intermediate image bearing elements or corrective masking images in photographic printing processes.

In the art of negative-positive photographic reproduction, a negative image is made by exposing to the lighted original scene or image, an unexposed light-sensitive negative material of the developing-out type, and developing the latent image to a silver negative image by conventional wet photographic developing and fixing processes. After drying, the negative image is used to produce a positive print of the original scene or image. This is done by exposing to light through the negative, the unexposed light-sensitive positive material. The latent image formed is then converted to a silver image by a conventional wet photographic development and fixing process.

Usually unless some special effect is wanted, these photographic reproduction processes are conducted in such a way as to reproduce the tone quality of the original in the print. Thus, if an original image were chosen that had a uniform series of density step tablets ranging from a maximum density to a minimum density, the negative image will reverse the density levels of the step tablet so the maximum density in the original is the minimum density in the negative etc., and the positive print made from the negative should be a reproduction of the original step tablet in which the density values of each step of the print are the same or close to the density values of the corresponding steps of the original. If the print has fewer density steps visible between the maximum and minimum density levels, the print is said to have a high contrast. It is known to use corrective masking techniques to reduce the print contrast, in such an instance, to make the print contrast match the original image contrast.

Corrective masks are made by exposing a developing-out masking element to light through the negative and developing a positive image having such a density and contrast that when it is superimposed over the negative and printed on the print material, a print of the desired contrast is obtained upon development.

In one process for printing color pictures, it is known to make color separations (of the original) consisting of a red color separation negative which is a black-and-white negative made by exposure to light from the original through a red filter, a green color separation negative and a blue color separation negative made through a green, and a blue filter, respectively. The red, green and blue color separations are then used photographically to make the corresponding positives which are used as the cyan, magenta and yellow ink printers, respectively. It is known to make developing-outmasks for one or more of the separation negatives to correct the color contrast.

Interstage masking, as it is known in the trade, is used to correct the contrast of color separation negatives so the color prints made from the separation negatives will have the proper color balance throughout their scale of densities. Interstage masking requires three masks of γ unity, one each for the red, green, and blue separation negatives. When properly prepared, these masks obliterate the negative densities until no images are visible. These three masks are called the "interstage masks." The interstage mask from the green separation negative is combined with the red separation negative and a mask is made which is then combined with the green separation in printing the final magenta positive. The procedure is repeated using the interstage mask from the red separation negative in combination with the green negative and a mask is then made which is combined with the red separation negative while printing the cyan positive. The interstage mask from the blue separation negative should theoretically be combined equally with the green and red; however, in practice, it is combined only with the green negative to make a mask which is combined with the blue separation while printing the yellow positive. The net effect of interstage masking is to raise the contrast of desired colors, lower the contrast of the unwanted colors (absorptions) and leave the neutral scale contrast unchanged.

In all of these photographic processes in which a negative image and/or one or more masking images are made, the exposed element in each instance must be given a wet process involving development, fixing, washing and drying to give an image that is usable in the printing process. Wet processing is quite time consuming. This is especially true in the masking operations since it may be necessary to make several masks and prints with them before one is obtained which will produce the desired print contrast of color correction.

Under certain conditions, dimensional problems may be encountered in masking operations in which the mask is made by wet processing. This may be especially critical in interstage masking.

It is, therefore, an object of my invention to provide a novel print-out element which is valuable for use as the negative (or positive) in a negative-positive process, of which is especially valuable in masking techniques for contrast control in black-and-white or in color processes using separation negatives.

Another object is to provide a printing process in which a negative image is made of an original by a print-out process and the positive print material printed from this negative without the usual inconvenience and time required by wet processing of the negative.

Another object is to provide a rapid process for making a contrast correcting mask for printing by using my print-out element for a mask, thus avoiding the wet processing and drying required by prior processes.

Another object is to provide a masking process that is free of dimensional problems that sometimes occur with prior processes.

Still other objects will become obvious from the following specification and claims.

These and other objects are accomplished by using the print-out element of my invention to make negatives and corrective masks. My element comprises a transparent support coated with a print-out emulsion layer that is sensitive to ultraviolet light only and is backed with an ultraviolet light absorbing layer which is transparent to light of wavelengths longer than the ultraviolet. The ultraviolet absorbing layer may be coated between the print-out emulsion layer and the support or on the opposite side of the support or over the print-out layer. Alternatively, the ultraviolet absorbing layer may be on a separate support, provided that it is used to protect the print-out layer (i.e., image) during subsequent printing steps.

My print-out element is used by exposing the print-out emulsion layer to an ultraviolet light image, then used in subsequent printing steps so that the visible printing light passes through the ultraviolet absorbing layer before passing through the print-out image layer onto the print material. In this way, the print-out image is protected from further exposure to ultraviolet light.

Any of the transparent supports used for photographic elements, such as glass, cellulose nitrate, cellulose acetate, the polycarbonates, etc., are used advantageously in making my elements.

Any ultraviolet absorbing layer that is transparent to light of other wavelengths is used in making my print-out elements. In general, these layers contain one or more ultraviolet absorbing materials that are dissolved or dispersed in a solvent medium together with a colloid binder which may or may not contain a mordant.

Binders that are particularly advantageous to use include gelatin, albumin, etc., cellulose derivatives, polyvinyl compounds, etc. The polymeric binders include polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26 percent as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamine having a combined acrylamide content of 30–60 percent and a specific viscosity of 0.25–1.5 on an imidized polyacrylamide of like acrylamide content and viscosity as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyanoacetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

Many of the ultraviolet absorbing materials are water soluble, while some of the others may require other solvents, such as a water-soluble organic solvent, a low boiling organic solvent, mixtures of these, or a high boiling water-immiscible organic solvent. The low boiling or water-soluble organic solvents that are used to advantage are disclosed in patents, such as Fierke et al. U.S. 2,018,171 and Vittum et al. U.S. 2,801,170, both issued July 30, 1957; Julian U.S. 2,949,360, issued August 16, 1960; etc. The low boiling substantially water-insoluble organic solvents include methyl, ethyl, propyl, and butyl acetates, isopropyl acetate, ethyl propionate, sec.-butyl alcohol, ethyl formate, butyl formate, nitromethane, nitroethane, carbon tetrachloride, chloroform, etc. The water-soluble organic solvents include methyl isobutyl ketone, β-ethoxy ethyl acetate, methyl cellosolve acetate, ethylene glycol, acetone, methanol, ethanol, acetonitrile, dimethylformamide, etc. The high boiling water-immiscible solvents include those described in U.S. Patent 2,322,027, issued June 15, 1943. Preferred solvents of this type include di-n-butylphthalate, benzylphthalate, triphenyl phosphate, tri-o-cresyl phosphate, diphenyl mono-p-tert.-butyl phenyl phosphate, etc.

Mordants may be used in the ultraviolet absorbing layers that contain an absorbing agent that has an acid or basic solubilizing group. Mordants used for such purposes include polyvinyl pyridine methyl-p-toluenesulfonate, phenol-formaldehyde ion exchange resins, the basic mordants of Minsk U.S. 2,882,156, issued April 14, 1959, prepared by condensing a polyvinyl-oxo-compound, such as a polyacrolein, a poly-γ-methylacrolein, a polyvinyl alkyl ketone, copolymers containing acrolein, etc., with an aminoguanidine compound, such as aminoguanidine bicarbonate, etc.

The solvents and techniques used to dissolve or disperse the ultraviolet absorbing materials in the colloid binder depend upon the particular absorbing material used and are described in the patent references listed later to illustrate the ultraviolet absorbing layers used.

Included among the ultraviolet absorbing layers used to advantage are those containing arylidene derivatives of fluorene, such as 9-p-chlorobenzalfluorene, 9-p-sulfobenzafluorene, etc., of Sawdey U.S. Patent 2,685,512, issued August 3, 1954; the ultraviolet absorbing layers of Fierke U.S. Patent 2,691,579, issued October 12, 1954, containing cyanine dyes such as 3-ethyl-3'-n-lauryloxathiazolinocyanine iodide, 3,3'-diethyl - 5,5' - diphenyl oxacyanine chloride, etc., or the dimethinecyanine dyes, such as [1 - n - nonyl - 2,5-dimethylpyrrole(3)][3-ethylbenzoxazole(2)]dimethinecyanine chloride, etc.; the ultraviolet absorbing layers of Sawdey et al. U.S. Patent 2,719,086, issued September 27, 1955, containing ultraviolet absorbers derived from resorcinol, such as 4-[3-(3-sulfobenzamido)benzoyl] - 6 - n - hexylresorcinol, 4-{α - [(3 - carboxyphenoxy)acetamido]benzoyl} - 6 - n-hexylresorcinol, etc.; the ultraviolet absorbing layers of Sawdey U.S. Patent 2,739,888, issued March 27, 1956, containing thiazolidine derivatives, such as 5 - benzylidene - 3 - ethyl - 3 - phenylimino - 4 - thiazolidone, 3-phenyl - 2 - phenylimino - 5 - vanillal - 4 - thiazolidone, 5 - benzal - 3 - ethylrhodanine, etc.; the ultraviolet absorbing layers of Van Allan U.S. Patent 2,748,021, issued May 29, 1956, containing the solubilized benzal derivatives of α-methyl-α-phenyl hydrazines, such as α-methyl - α - phenyl - 3 - sulfo - 4 - methoxybenzalhydrazone (sodium salt), o - sulfo - benzal-α-methyl-α-phenylhydrazone (p-anisidine salt), etc.; the ultraviolet absorbing layers of Sawdey U.S. Patent 2,808,330, issued October 1, 1957, containing thiazolidones, such as 5 - benzylidene - 3 - ethyl - 2 - phenylimino - 4 - thiazolidone, 5-m - nitrobenzal - 3 - phenyl - 2 - phenylimino - 4 - thiazolidone, etc., a rhodanine, such as 5-benzal-3-ethylrhodanine, etc.; the layers containing the polymeric ultraviolet absorbing compounds of Van Allan et al. U.S. Patent 2,882,150, issued April 14, 1959; the ultraviolet absorbing layers of Sawdey U.S. Ser. No. 144,228, filed October 10, 1961, which contain substituted benzotriazoles, such as 2 - (2' - hydroxy - 5' - iso - octylphenyl) benzotriazole, 2 - (2' - hydroxy - 3',5' - di - tert - amylphenyl)benzotriazole, 2 - (2' - hydroxy - 5' - dodecylphenyl)benzotriazole, etc.

Any print-out emulsion that is sensitive to ultraviolet and substantially insensitive to light in the visible region of the spectrum is used advantageously in my print-out elements. Such print-out emulsions include the silver halide and the non-silver print-out emulsions. Gelatin silver chloride emulsions that are nonoptically sensitized are used to advantage since they are sensitive to ultraviolet but not light in the visible region. These emulsions are frequently made so that there is an excess of silver ions present, that is, an excess of a soluble silver compound, or alternatively, halogen absorbers such as silver nitrate, alkaline materials such as borax, sodium hydroxide, ammonium hydroxide, organic alkalies, such as pyridine or amines. In addition to the silver halide emulsions described, gelatin emulsions containing the silver salts of certain pyrazolone compounds as described by Sheppard et al. in U.S. Patent 2,066,582, issued January 5, 1937, are used to advantage. Any of the gelatin substitutes well known in the art may be used in these print-out emulsions in place of gelatin. These include materials such as the colloidal binders used in the ultraviolet absorbing layer.

An example of a nonsilver print-out emulsion that is used to advantage in my print-out element consists of a colloid layer containing certain ultraviolet sensitive organic azido compounds, such as 2-azidobenzoxazole, 2-azidobenzimidazole, 5-azidotetrazole[a]phthalazine, 4-azido-6-methyl - 1,3,3a,7-tetraazaindene, 2,4-diazido-6-methylpyrimidine, etc., and certain heterocyclic coupling compounds such as benzo[a]phenothiazine, benzo[b]phenoxazine, etc., as described in Sagura et al. U.S. Serial No. 6,888, filed February 5, 1960.

Upon exposure (of the nonsilver print-out emulsion described in the preceding paragraph) to ultraviolet light, the azido compound is oxidized to the corresponding diazo compound which then couples with the heterocyclic compound to form a dye image.

Similarly, my print-out element contains a colloid layer containing an ultraviolet sensitive organic azido compound such as described above and a photographic color-forming coupler compound, of the phenolic type or the naphtholic type, such as 1-hydroxy-N-[δ-(3-pentadecylphenoxyl)butyl] - 2-naphthamide, a coupler compound of the reactive methylene type, for example, a coumarone, and a pyrazolone, such as 1-(2,4,6-trichlorophenyl) - 3-[α-(3-pentadecylphenoxy)butyramido] - 5-pyrazolone, etc., and an open chain type reactive methylene coupler, such as α-benzoyl-2-methoxy-5-[α-(3-pentadecylphenoxy)butyramido]acetanilide, etc., as described in Bush et al. U.S. Patent 2,908,573, issued October 13, 1953. In this element, the diazo compound (formed by light exposure of the azido compound) couples with the coupler compound to form a dye image.

Included among the uses for my print-out element are:

(1) As a mask for reducing over-all contrast;
(2) As a color-correcting mask for color separation negatives;
(3) As an intermediate positive from which duplicate negatives of fine quality are made, in duplicating X-ray pictures, etc.;
(4) As a dodging mask, when combined with a negative, the mask simply darkened in areas that should be rendered lighter when printing such negatives;
(5) As an interstage mask for complete color correction;
(6) In motion picture work, for masking or for duplicating; etc.

The effective contrast of a mask made from my element can be increased or decreased with suitable filters because of the blue-violet color of the print-out image (silver print-out image).

My print-out element is used to make a negative by exposing the print-out emulsion layer to ultraviolet light through the original to obtain the negative print-out image, then this negative image is printed onto print material by passing the visible printing (i.e., exposing) light through the element so that it passes through the ultraviolet light absorbing layer before passing through the image layer onto the print material. The exposed print is then developed in the normal manner.

My print-out element is used to make corrective masks in a similar way. The negative (or positive) to be masked is exposed as described so as to produce a mask image having the desirde density and contrast characteristics so that when it is combined with the negative (or positive) and printed, a contrast corrected print will be obtained. My corrective masks are used for black and white, color separation negatives, complete color correction of three color separation negatives as is done in interstage masking, dodging masks for general control of black-and-white pictures, etc.

My invention is still further described by the following illustrative examples but is not to be limited to these examples.

*Example 1*

A cellulose acetate support was coated with a gelatin silver chloride emulsion at a covering of 230 mg. of silver and 890 mg. of gelatin per square foot of coating. For use in the following examples, an ultraviolet absorbing Kodak 2A filter was placed in the printing light (i.e., visible region) beam ahead of the print-out element. This gave the same effect as would have been obtained if the ultraviolet filter layer had been coated as an integral part of the element either between the support and print-out emulsion layer, over the print-out layer or on the opposite side of the support from the print-out layer.

Similarly, other print-out elements can be made according to my invention as indicated previously herein. Included among these print-out materials are those having a non-silver print-out emulsion, such as those containing an ultraviolet sensitive organic azide and a coupling compound described herein above.

*Example 2*

The ultraviolet sensitive layer of a piece of my print-out element described in Example 1 was exposed through an original negative on Eastman Super-XX Film for 10 minutes to the ultraviolet light from a bank of closely mounted fluorescent tubes (such as General Electric 340 Black Light Tubes) approximately 2 to 3 inches distance from the elements. The progress of print-out image formation was observed by opening one half of the printing frame and observing the image in subdued incandescent light. A print-out positive having a purplish-red image of very fine-grain structure and excellent scale was obtained. This positive was printed on Eastman Plus-X Film through a Wratten #61 Green Filter (24 inches from the lens of a Precision Enlarger Set at f/8) with an 8-second exposure. The exposed film was developed for 6 minutes in a developer having the following composition:

| | G. |
|---|---|
| p-Methylaminophenol sulfate | 2.5 |
| Sodium sulfite, desiccated | 30.0 |
| Hydroquinone | 2.5 |
| Sodium metaborate octahydrate | 10.0 |
| Potassium bromide | 0.5 |
| Water to make 1.0 l. | | fixed in a conventional sodium thiosulfate fixing bath, washed and dried to produce a duplicate negative which matched the original very closely throughout the scale.

This process was used to produce good quality duplicates of an image on an X-ray film.

Similarly, good quality duplicates were produced from print-out positives made from the original negative using other fine-grain emulsions, such as Eastman Positive Film, Eastman Commercial Ortho Film, etc.

Printing of black-and-white negatives which have long range of tones and high contrast usually produces poor quality prints when a softer (less contrasty) grade of paper is used to produce satisfactory high-light density. A print-out mask helps in completely reproducing the detail that is in the negative without loss of contrast, as well as producing a somewhat sharper picture as well. This is due to the slightly diffusing effect of the print-out emulsion and because the slightly diffusing mask is on the back of the negative and acts like an unsharp mask. The following typical example will serve to illustrate these effects.

*Example 3*

An 8 x 10 negative (enlarged from a 35 mm. Kodachrome Film transparency) with a density range of 1.74 was printed on #3 Kodabromide Paper with an exposure to produce the best possible print with 2 minutes' development in a developer of the composition diluted 1 part with 3 parts of water.

| | G. |
|---|---|
| p-Methylaminophenol sulfate | 3.0 |
| Sodium sulfite, desiccated | 45.0 |
| Hydroquinone | 12.0 |
| Sodium carbonate, monohydrate | 80.0 |
| Potassium bromide | 2.0 |
| Water to make 1.0 l. | |

Following development, the print was fixed in a conventional sodium thiosulfate fixing bath, washed and dried to produce a print having good contrast, but the highlights and shadows were wanting in detail. The same picture printed on #2 Kodabromide Paper restored the high-light detail but the shadows appeared blocked and the print was lacking in contrast. A piece of my print-out element from Example 1 was attached to the back of the negative (i.e., print-out layer in contact with the negative support) and exposed for 2 minutes to the ultraviolet light source used in Example 2. A second print on #3 Kodabromide Paper produced marked improvement in the reproduction of image detail in both highlights and shadows. The mask was then exposed to the ultraviolet light for another 2 minutes to increase the mask image density. A third print made from the negative with the mask on another piece of #3 Kodabromide Paper showed a further increase in image detail and tone gradation. This indicates that with one contrast grade of paper (#3 or #4), any contrast print can be made by varying the depth of the print-out mask, with the added advantage which the softer (less contrasty) paper cannot produce, i.e., detail in the highlights and shadows with full contrast.

Color correcting masks for separation negatives are usually made on panchromatic masking film. This type of mask usually gives no dimensional troubles, except during extreme weather conditions.

The advantage of masking separation negatives with my print-out element are illustrated as follows.

*Example 4*

A print-out mask was prepared for a separation negative by exposing the print-out emulsion (of the element of Example 1) with ultraviolet light through the separation negative as described in Example 2. Because no development, fixing, washing or drying was needed, the mask was produced and ready for use in a few minutes. For example, a 15 percent mask was printed out by 3 minutes' exposure to the ultraviolet light source, and a 25 percent mask was produced by an 8-minute exposure. The color of the mask has no effect on the final results, but it appears visually stronger and is easier to judge. The mask density can be measured with a color denistometer through a green filter and should have about double the density range of a black-and-white mask used for the same purpose.

*Example 5*

Interstage masking requires a total of six masks as described previously. According to my invention, the first three masks are made with my print-out element, thus eliminating the time consuming wet processing and drying required by conventional masking elements. Moreover, the printing of the interstage masks is judged with relative ease because the image can be examined through a green filter; and, when properly printed, a complete obliteration of the density difference is achieved. This usually requires 10 to 15 minutes' exposure to the ultraviolet light source of Example 2. Making such masks by development is not easy since the mask cannot be evaluated until it is dry and then nothing can be done to correct it, except by making a new mask. The final masks are made on Eastman Ortho Films from the separation negatives bound together with the print-out interstage masks. Exposure and development of the final mask is self-regulating, since this mask must not show any steps printed on the gray scale.

*Example 6*

In instances where a black-and-white picture must be controlled locally during printing, e.g., holding back the foreground, to increase exposure, over-brilliant sky, etc., a piece of print-out film can be locally fogged to produce a permanent dodging mask for such a negative so that a large number of prints can be made exactly alike and the dodging is automatically controlled by the mask. Any means to control the print-out mask for the proper areas of the negative to be dodged can be used, e.g., cutout patterns of black paper, etc.

My invention is still further illustrated by the accompanying drawings, FIG. 1, FIG. 2, FIG. 3, FIG. 4, FIG. 5 and FIG. 6. These drawings show enlarged cross-sectional views of my print-out element, an original and print elements.

FIG. 1 shows my print-out element comprised of transparent support 15 coated in succession with ultraviolet light absorbing layer 14 and silver halide print-out emulsion layer 13 that is sensitive to ultraviolet light but substantially insensitive to light of other wavelengths being exposed to ultraviolet light source 10 through the original image layer 12 on transparent support 11.

Figure 2:
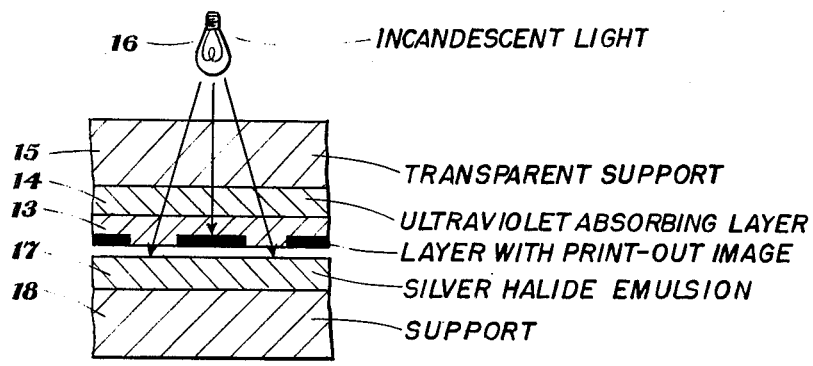

FIG. 2 shows print material comprised of support 18 coated with light-sensitive silver halide emulsion layer 17 being exposed to incandescent light source 16 through the print-out image made in FIG. 1 so the light passes first through support 15, then ultraviolet light absorbing layer 14 and finally through the print-out image layer 13.

Figure 3:

FIG. 3 shows the developed-out silver image in layer 17 on support 18 made by developing the print material being exposed in FIG. 2. The image in FIG. 3 layer 17 is a duplicated of the original image in FIG. 1 layer 12 made via print-out (negative) image in layer 13.

FIG. 4 shows the exposure of print-out emulsion layer 13 to ultraviolet light source 10 through the original image in layer 12 with print-out layer 13 in contact with support 11 of the original.

FIG. 5 shows the exposure of print material comprised of light-sensitive silver halide emulsion layer 19 coated on support 20 to incandescent light source 16 through transparent support 15, ultraviolet light absorbing layer 14, print-out mask image layer 13, transparent support 11 and original image layer 12.

FIG. 6 shows the developed silver image layer 19 on support 20, said image being the masked print of original image 12 obtained by developing the print being exposed in FIG. 5.

My print-out element is valuable for use in a variety of photographic reproduction processes because it eliminates the need for the inconvenient and time consuming photographic wet processing steps that would be required by use of a developing-out type element conventionally used. For example, it is valuable for producing a print-out negative image of an original which can then be used immediately to photographically print a positive image of the original. My print-out element is particularly valuable for use in making the masks needed for masking processes used for the control of contrast, color balance, etc., in photographic reproduction processes not only because of the elimination of wet processing but because of the ease of controlling the mask density, and the freedom of dimensional problems sometimes experienced with masks made with developing-out masking elements.

The invention has been described in detail with particular reference to preferred embodiments thereof but it will be understood that variations and modifications can be effected within the spirit and scope of the invention as described hereinabove and as defined in the appended claims.

I claim:
1. A photographic print-out element comprising:
    (1) a transparent support;
    (2) an ultraviolet light-absorbing layer that transmits light of other wavelengths, said layer comprising:
        (a) a colloid binder and
        (b) an ultraviolet absorbing material selected from the class consisting of an arylidene derivative of fluorene, a cyanine dye, a hexylresorcinol derivative, a thiazolidone, a benzal derivative of α-methyl-α-phenylhydrazine, a rhodanine, and a substituted benzotriazole; and
    (3) a print-out emulsion layer that is sensitive to ultraviolet light and substantially insensitive to light of other wavelengths, said emulsion layer comprising:
        (a) a colloid binder having dispersed therein
        (b) an ultraviolet sensitive material selected from the class consisting of silver chloride, a silver salt of a pyrazolone, a mixture of an ultraviolet sen- sitive azido compound with a heterocyclic azine, a mixture of an ultraviolet sensitive azido compound with a phenolic coupling compound, a mixture of an ultraviolet sensitive azido compound with a pyrazolone coupling compound, and a mixture of an ultraviolet-sensitive azido compound with an open chain coupling compound containing a reactive methylene group.

2. A photographic print-out element of claim 1 in which the said transparent support is coated in succession on one side with the said ultraviolet light-absorbing layer and said print-out emulsion layer.

3. A photographic print-out element comprising:
  (1) a cellulose acetate support coated in succession with;
  (2) an ultraviolet light-absorbing layer that transmits light of other wavelengths, said layer comprising:
    (a) gelatin and
    (b) an ultraviolet absorbing material selected from the class consisting of an arylidene derivative of fluorene, a cyanine dye, a hexylresorcinol derivative, a thiazolidone, a benzal derivative of α-methyl-α-phenylhydrazine, a rhodanine and a substituted benzotriazole; and
  (3) a gelatino-silver chloride print-out emulsion layer.

4. A photographic printing process for creating a visible print-out image in a photographic print-out element comprising:
  (1) a transparent support;
  (2) an ultraviolet light absorbing layer that transmits light of other wavelengths, said layer comprising:
    (a) a colloid binder and
    (b) an ultraviolet absorbing material selected from the class consisting of an arylidene derivative of fluorene, a cyanine dye, a hexylresorcinol derivative, a thiazolidone, a benzal derivative of α-methyl-α-phenylhydrazine, a rhodanine, and a substituted benzotriazole; and
  (3) a print-out emulsion layer that is sensitive to ultraviolet light and substantially insensitive to light of other wavelengths, said emulsion layer comprising:
    (a) a colloid binder having dispersed therein
    (b) an ultraviolet sensitive material selected from the class consisting of silver chloride, a silver salt of a pyrazolone, a mixture of an ultraviolet sensitive azido compound with a heterocyclic azine, a mixture of an ultraviolet sensitive azido compound with a phenolic coupling compound, a mixture of an ultraviolet sensitive azido compound with a pyrazolone coupling compound, and a mixture of an ultraviolet sensitive azido compound with an open chain coupling compound containing a reactive methylene group, said print-out image being useful for printing photographic elements of the developing-out type, said process consisting of the step of exposing the said print-out emulsion layer to an ultraviolet light image to produce a visible print-out image.

5. In a photographic process for reproducing an original image in which a light-sensitive developing-out element with a silver halide emulsion layer is exposed to light through said original to produce a latent image in said element which is then developed to produce a visible negative image of said original, and a second light-sensitive developing-out element with a silver halide emulsion layer is exposed to light through the said negative image to produce a latent image of said negative image in the said second element which is then developed to produce a visible positive reproduction of said original image, the improvement comprising the use of a photographic print-out element comprising:
  (1) a transparent support;
  (2) an ultraviolet light absorbing layer that transmits light of other wavelengths, said layer comprising:
    (a) a colloid binder and
    (b) an ultraviolet absorbing material selected from the class consisting of an arylidene derivative of fluorene, a cyanine dye, a hexylresorcinol derivative, a thiazolidone, a benzal derivative of α-methyl-α-phenylhydrazine, a rhodanine, and a substituted benzotriazole; and
  (3) a print-out emulsion layer that is sensitive to ultraviolet light and substantially insensitive to light of other wavelengths, said emulsion layer comprising:
    (a) a colloid binder having dispersed therein
    (b) an ultraviolet sensitive material selected from the class consisting of silver chloride, a silver salt of a pyrazolone, a mixture of an ultraviolet sensitive azido compound with a heterocyclic azine, a mixture of an ultraviolet sensitive azido compound with a phenolic coupling compound, a mixture of an ultraviolet sensitive azide compound with a pyrazolone coupling compound, and a mixture of an ultraviolet sensitive azido compound with an open chain coupling compound containing a reactive methylene group, in place of the said developing-out element to produce the said negative reproduction of said original image so that the improved process comprises the steps:
  (A) creating a print-out negative of the original image by passing ultraviolet light through the original image onto the said print-out emulsion layer of said print-out element.
  (B) creating a latent image in the said second developing-out element by passing said light through the print-out image in said print-out element so said light passes through the ultraviolet absorbing layer before passing through the print-out layer, and
  (C) developing said latent image created in step (B) into a silver image duplicating the said original image.

6. In a photographic masking process for reproducing an original image in which a light-sensitive developing-out element with a silver halide emulsion layer is exposed to light through said original image to produce a latent image of said original image, developing a visible masking image, then exposing a second developing out element with a silver halide emulsion layer to light through the said original image masked with said masking image, said mask image being registered in superposed relation with the said original image, to produce a latent image, and developing said exposed second developing-out element to produce a visible negative image of the said original, the improvement comprising the use of a photographic print-out element comprising:
  (1) a transparent support;
  (2) an ultraviolet light absorbing layer that transmits light of other wavelengths, said layer comprising:
    (a) a colloid binder and
    (b) an ultraviolet absorbing material selected from the class consisting of an arylidene derivative of fluorene, a cyanine dye, a hexylresorcinol derivative, a thiazolidone, a benzal derivative of α-methyl-α-phenylhydrazine, a rhodanine, and a substituted benzotriazole; and
  (3) a print-out emulsion layer that is sensitive to ultraviolet light and substantially insensitive to light of other wavelengths, said emulsion layer comprising:
    (a) a colloid binder having dispersed therein
    (b) an ultraviolet sensitive material selected from the class consisting of silver chloride, a silver salt of a pyrazolone, a mixture of an ultraviolet sensitive azido compound with a heterocyclic azine, a mixture of an ultraviolet sensitive azido compound with a phenolic coupling compound, a mixture of an ultraviolet sensitive azido compound with a pyrazolone coupling compound, and a mixture of an ultraviolet sensitive azido compound with an open chain coupling compound containing a reactive methylene group, in place of the said developing-out element to produce the said mask image of the said original image so that the improved process comprises the steps:

(A) forming a print-out mask in said print-out element by passing ultraviolet light through the said original image onto the said print-out emulsion layer until the desired print-out mask density is obtained, and (B) forming a photographic print of said original image masked with the print-out mask formed in step (A), said mask image being registered in superposed relation with the said original image, by exposing the light-sensitive layer of said second developing-out element to the said light which has been passed through the transparent support, the ultraviolet absorbing layer and the print-out image of the said print-out element then through the original image onto the light-sensitive layer of the said second developing-out element, and subsequently developing the latent image thus formed to a silver negative image reproduction of the said original image.

References Cited by the Examiner

UNITED STATES PATENTS

| | | | |
|---|---|---|---|
| 2,203,652 | 6/1940 | Ehrenfried | 96—6 |
| 2,606,833 | 8/1952 | Glickman | 96—84 |
| 2,732,304 | 1/1956 | Vanselow et al. | 96—67 |
| 2,927,025 | 3/1960 | Ryskiewicz | 96—48 X |
| 3,042,516 | 7/1962 | Wainer | 96—48 |
| 3,062,650 | 11/1962 | Sagura et al. | |
| 3,105,761 | 10/1963 | Foris | 96—44 X |

FOREIGN PATENTS 471,366 9/1937 Great Britain.

NORMAN G. TORCHIN, *Primary Examiner.*

PO-1050
(5/69)

UNITED STATES PATENT OFFICE
CERTIFICATE OF CORRECTION

Patent No. 3,253,918      Dated May 31, 1966

Inventor(s) Louis M. Condax

It is certified that error appears in the above-identified patent and that said Letters Patent are hereby corrected as shown below:

Column 10, line 17, delete "azide", and substitute in its place, --azido--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents